United States Patent
Bojjanapalli et al.

(10) Patent No.: US 11,692,909 B2
(45) Date of Patent: Jul. 4, 2023

(54) SENSOR ASSEMBLIES AND METHODS OF MAKING SENSOR ASSEMBLIES (71) Applicant: Rosemount Aerospace, Inc., Burnsville, MN (US)

(72) Inventors: Muralidhar Rao Bojjanapalli, Telangana (IN); Venkata Anil Kumar Mothe, Karnataka (IN); Venkatasubramanian Chockalingamaharaja, Bangalore (IN)

(73) Assignee: ROSEMOUNT AEROSPACE. INC., Burnsville, MN (US)

( * ) Notice: Subject to any disclaimer, the term of this patent is extended or adjusted under 35 U.S.C. 154(b) by 864 days.

(21) Appl. No.: 16/653,218

(22) Filed: Oct. 15, 2019

(65) Prior Publication Data

US 2021/0048371 A1 Feb. 18, 2021

(30) Foreign Application Priority Data

Aug. 16, 2019 (IN) .............................. 201911033138

(51) Int. Cl.
| | | |
|---|---|---|
| *G01M 15/02* | (2006.01) | |
| *F01D 17/02* | (2006.01) | |
| *G01M 15/14* | (2006.01) | |
| *G01D 11/24* | (2006.01) | |
| *G01K 1/12* | (2006.01) | |
| *G01L 19/14* | (2006.01) | |
| *G01K 1/14* | (2021.01) | |
| *G01D 11/30* | (2006.01) | |

(52) U.S. Cl.
CPC ............. *G01M 15/02* (2013.01); *F01D 17/02* (2013.01); *G01D 11/245* (2013.01); *G01D 11/30* (2013.01); *G01K 1/12* (2013.01); *G01K 1/14* (2013.01); *G01L 19/142* (2013.01); *G01M 15/14* (2013.01)

(58) Field of Classification Search
CPC .... G01M 15/02; G01M 15/14; G01D 11/245; G01D 11/30; G01K 1/12; G01K 1/14
See application file for complete search history.

(56) References Cited

U.S. PATENT DOCUMENTS

| | | | | |
|---|---|---|---|---|
| 5,224,383 A | * | 7/1993 | Pinto ..................... | G01L 9/0072 73/756 |
| 8,052,484 B1 | * | 11/2011 | Salisbury ............. | H01R 13/642 439/680 |
| 8,742,944 B2 | * | 6/2014 | Mitchell ................ | G01K 1/024 340/870.16 |

(Continued)

OTHER PUBLICATIONS

Anonymous: "Promoting Powder Metallurgy Technology Introduction to Additive Manufacturing Technology" Apr. 1, 2013, 44 pages.

(Continued)

*Primary Examiner* — Jamel E Williams
(74) *Attorney, Agent, or Firm* — Cantor Colburn LLP (57) ABSTRACT

A sensor assembly includes a mounting portion arranged to support a sensing device, a thermal shunt portion extending from the mounting portion, and a housing portion. The housing portion extends from the thermal shunt portion and is arranged on a side of the thermal shunt portion opposite the mounting portion to limit temperature of a sensor connector fixed to the housing portion of the sensor assembly. Gas turbine engines having sensor assemblies and methods of making sensor assemblies are also described.

11 Claims, 9 Drawing Sheets

(56) References Cited

U.S. PATENT DOCUMENTS

| | | | |
|---|---|---|---|
| 2006/0156835 A1* | 7/2006 | Mueller | G01F 23/296 73/866.5 |
| 2017/0179632 A1* | 6/2017 | Rautenbach | H01R 43/005 |
| 2019/0085983 A1* | 3/2019 | Dunham | B22F 10/40 |

OTHER PUBLICATIONS

European Search Report for Application No. 19211306.6, dated May 28, 2020, 54 pages.

* cited by examiner

SENSOR ASSEMBLIES AND METHODS OF MAKING SENSOR ASSEMBLIES

CROSS-REFERENCE TO RELATED APPLICATIONS

This application claims the benefit of Indian Patent Application 201911033138 filed Aug. 16, 2019, the disclosure of which is incorporated herein by reference in its entirety.

BACKGROUND

The present disclosure generally relates to sensors, and more particularly to sensor assemblies having thermal shunts.

Sensors, such as in gas turbine engines, are commonly used to acquire information to support operation of the engine. In some applications it is necessary to position a sensor at a location where the sensor is exposed to high temperature, such as on the engine case or in proximity to the turbine. In such a case the sensor generally requires a customized electrical connector suitable for the temperatures at the sensor location. Customization is typically accomplished with a ceramic insulator and threaded stud assembly, the ceramic insulator providing electrical isolation to the threaded stud and the threaded stud providing electrically connectivity to sensor leads supported within the sensor. In some sensors the ceramic insulator can be prone to fracture. The sensor leads can also be subject to embrittlement due to heat communicated to the sensor leads.

Such systems and methods have generally been satisfactory for their intended purposes. However, there remains a need in the art for improved sensor assemblies, gas turbine engines, and methods of making sensor assemblies.

BRIEF DESCRIPTION

According to one embodiment, a method of making a sensor assembly is provided. The method includes fusing a metallic particulate using an additive manufacturing technique to define a mounting portion arranged to support a sensing device; fusing the metallic particulate to define a thermal shunt portion extending from the mounting portion; and fusing the metallic particulate to define a housing portion extending from the thermal shunt portion, the housing portion arranged on a side of the thermal shunt portion opposite the mounting portion to limit temperature of a sensor connector fixed to the housing portion of the sensor assembly.

In addition to one or more of the features described above, or as an alternative, further embodiments of the method may include fixing a sensor to the mounting portion of the sensor assembly.

In addition to one or more of the features described above, or as an alternative, further embodiments of the method may include electrically connecting a measurement lead to the sensor.

In addition to one or more of the features described above, or as an alternative, further embodiments of the method may include brazing or welding the sensor connector to the housing portion of the sensor assembly, the sensor connector conforming to a military standard.

In addition to one or more of the features described above, or as an alternative, further embodiments of the method may include arranging the measurement lead within the housing portion of the sensor assembly.

In addition to one or more of the features described above, or as an alternative, further embodiments of the method may include supporting the measurement lead within the housing portion of the sensor assembly with a potting material body.

In addition to one or more of the features described above, or as an alternative, further embodiments of the method may include electrically connecting the measurement lead to the sensor connector.

According to another embodiment a sensor assembly is provided. The sensor assembly includes a sensor connector, a mounting portion spaced apart from the sensor connector, a thermal shunt portion extending from the mounting portion, and a housing portion having the sensor connector mounted thereon and extending from the thermal shunt portion, the housing portion arranged on a side of the thermal shunt portion opposite the mounting portion to limit heat conducted to the sensor connector.

In addition to one or more of the features described above, or as an alternative, further embodiments of the sensor assembly may include a thermocouple, a pressure transducer, or a flow meter fixed to the mounting portion of the sensor assembly; and further including a measurement lead arranged at least partially within the housing portion of the sensor assembly.

In addition to one or more of the features described above, or as an alternative, further embodiments of the sensor assembly may include a sensor connector fixed to the housing portion of the sensor assembly, the sensor connector having a circular shell or conforming to a military standard, and a brazed or welded joint fixing the sensor connector to the housing portion of the sensor assembly.

In addition to one or more of the features described above, or as an alternative, further embodiments of the sensor assembly may include a potting material body disposed within the housing portion of the sensor assembly.

In addition to one or more of the features described above, or as an alternative, further embodiments of the sensor assembly may include that the mounting portion has a sensor fastener pattern corresponding to a case fastener pattern located on a gas turbine engine case.

In addition to one or more of the features described above, or as an alternative, further embodiments of the sensor assembly may include that the thermal shunt portion comprises an airfoil structure extending between the housing portion and the mounting portion of the sensor assembly.

In addition to one or more of the features described above, or as an alternative, further embodiments of the sensor assembly may include that the mounting portion and the housing portion of the sensor assembly are arranged along a sensor axis, the airfoil structure including two or more airfoils distributed circumferentially about the sensor axis.

In addition to one or more of the features described above, or as an alternative, further embodiments of the sensor assembly may include that the airfoil structure comprises an airfoil having a leading edge, the leading edge extending between the mounting portion and the housing portion of the sensor assembly.

In addition to one or more of the features described above, or as an alternative, further embodiments of the sensor assembly may include that the thermal shunt portion comprises a lattice structure extending between the housing portion and the mounting portion of the sensor assembly.

In addition to one or more of the features described above, or as an alternative, further embodiments of the sensor assembly may include that the mounting portion comprises two or more mounting portion layers fused to one another, that the thermal shunt portion includes two or more thermal shunt portion layers interfused to one another, and the housing portion includes two or more housing portion layers interfused with one another, each of layers including an interfused metallic particulate, the two or more thermal shunt portion layers coupling the two or more housing portion layers to the two or more mounting portion layers.

In addition to one or more of the features described above, or as an alternative, further embodiments of the sensor assembly may include a thermal barrier layer disposed on a side of the mounting portion opposite the thermal shunt portion of the sensor assembly.

In addition to one or more of the features described above, or as an alternative, further embodiments of the sensor assembly may include that the sensor assembly has a low thermal resistance path and a high thermal resistance path; the low thermal resistance path including the mounting portion and the thermal shunt portion; and the high thermal resistance path includes the mounting portion, the thermal shunt portion, and the housing portion.

According to a further embodiment, a gas turbine engine is provided. The gas turbine engine includes a case housing one or more of a compressor, a combustor, and a turbine, a sensor assembly as described above, and an engine harness with a harness connector coupled to the sensor connector, the harness connector and the sensor connector conforming to a military standard.

Technical effects of the present disclosure include reduction of the temperature of the housing portion of the sensor assembly in relation to the mounting portion of the sensor assembly for a given application. In certain embodiments, the sensor assemblies described herein can operate in high temperature environments without employing ceramic structures. In accordance with certain embodiments, the sensor assemblies described herein can employ standardized sensor connectors, such as MIL-STD connectors, simplifying the construction of the sensor assemblies.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
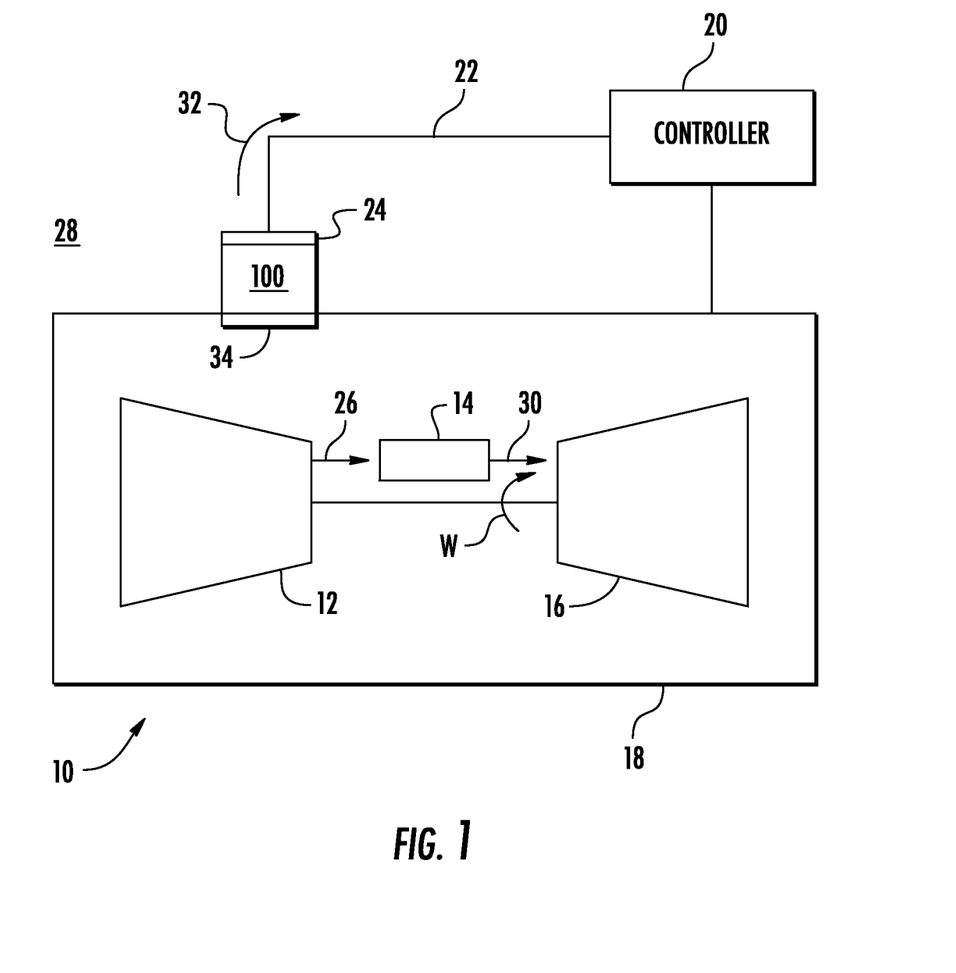
FIG. 1 is a schematic view of a sensor assembly constructed in accordance with the present disclosure, showing the sensor assembly connected to the case of gas turbine engine and communicating a signal representative of an operating parameter of the gas turbine engine.

Reference will now be made to the drawings wherein like reference numerals identify similar structural features or aspects of the subject disclosure. For purposes of explanation and illustration, and not limitation, a partial view of an exemplary embodiment of a sensor assembly in accordance with the disclosure is shown in FIG. 1 and is designated generally by reference character 100. Other embodiments of sensor assemblies, mounts for sensors, and methods of making sensor assemblies and mounts for sensor assemblies in accordance with the present disclosure, or aspects thereof, are provided in FIGS. 2-9, as will be described. The systems and methods described herein can be used for mounting sensors using standard electrical connectors, such as to provide electrical communication between thermocouples and engine harnesses high temperature applications like gas turbine engines, though the present disclosure is not limited to any particular type of sensor or to high temperature applications in general.

Referring to FIG. 1, a gas turbine engine 10 is shown. The gas turbine engine 10 includes a compressor 12, a combustor 14, a turbine 16, and a case 18. The gas turbine engine 10 also includes a controller 20, an engine harness 22 with a harness connector 24, and a sensor assembly 100.

The compressor 12 is operably associated with the turbine 16 and is arranged to generate working fluid flow 26 using fluid ingested from the ambient environment 28. The combustor 14 is in fluid communication with the compressor 12 and is arranged to generate a flow of high pressure combustion products 30 using the working fluid flow 26, which the combustor 14 receives from the compressor 12. The turbine 16 is in fluid communication with combustor 14, is operably connected to the compressor 12, and is arranged to extract work W from the high pressure combustion products 30 received from the combustor 14. During operation the turbine 16 communicates a portion of the extracted W to the compressor 12, which the compressor 12 uses to generate the working fluid flow 26. The controller 20 is operably connected to the gas turbine engine 10 to control operation of the gas turbine engine 10. In certain embodiments the controller is a full authority digital engine controller, an electronic engine controller, or an engine control unit.

As will be appreciated by those of skill in the art in view of the present disclosure, the controller 20 can require information relating to one or more operating parameters of the gas turbine engine 10. For example, the controller 20 may require information relating to one or more of: temperature; pressure; and/or fluid flow within the gas turbine engine 10. To provide the information required by the controller 20 the sensor assembly 100 is connected to the case 18, is disposed in communication with the controller 20 through the engine harness 22, and is configured to provide a signal 32 indicative of an operating parameter to the controller 20. Communication with the controller 20 occurs through the harness connector 24, which is mechanically connected to the sensor assembly 100, and is arranged to communicate a signal 32 generated by the sensor assembly 100 to the controller 20.

As will also be appreciated by those of skill in the art in view of the present disclosure, the sensor assembly 100 be exposed to relatively high temperatures, e.g., temperatures in excess of 200 degrees Celsius. Since such temperatures can exceed those tolerable by standard electrical connectors, some sensor assemblies employ customized ceramic terminal assemblies having ceramic insulators to isolate the measurement leads from each other and the sensor housing, typically in cooperation with a potting composition disposed within the sensor to support the measurement leads. While generally acceptable for their intended purpose, the ceramic structures and/or the braze fixing the ceramic structures to the sensor housing can fracture. Heat conducted to the measurement leads can also cause embrittlement of the measurement leads over time, potentially resulting in the measurement lead developing an open circuit. To limit (or eliminate entirely) the reliability challenges posed by ceramic/braze fracture and lead embrittlement the sensor assembly 100 includes a high thermal resistance path 102 (shown in FIG. 2) between the case 18 and a housing portion 104 of the sensor assembly 100, allowing the sensor assembly 100 to communicate with the engine harness 22 without ceramic terminal assemblies.

Figure 2:
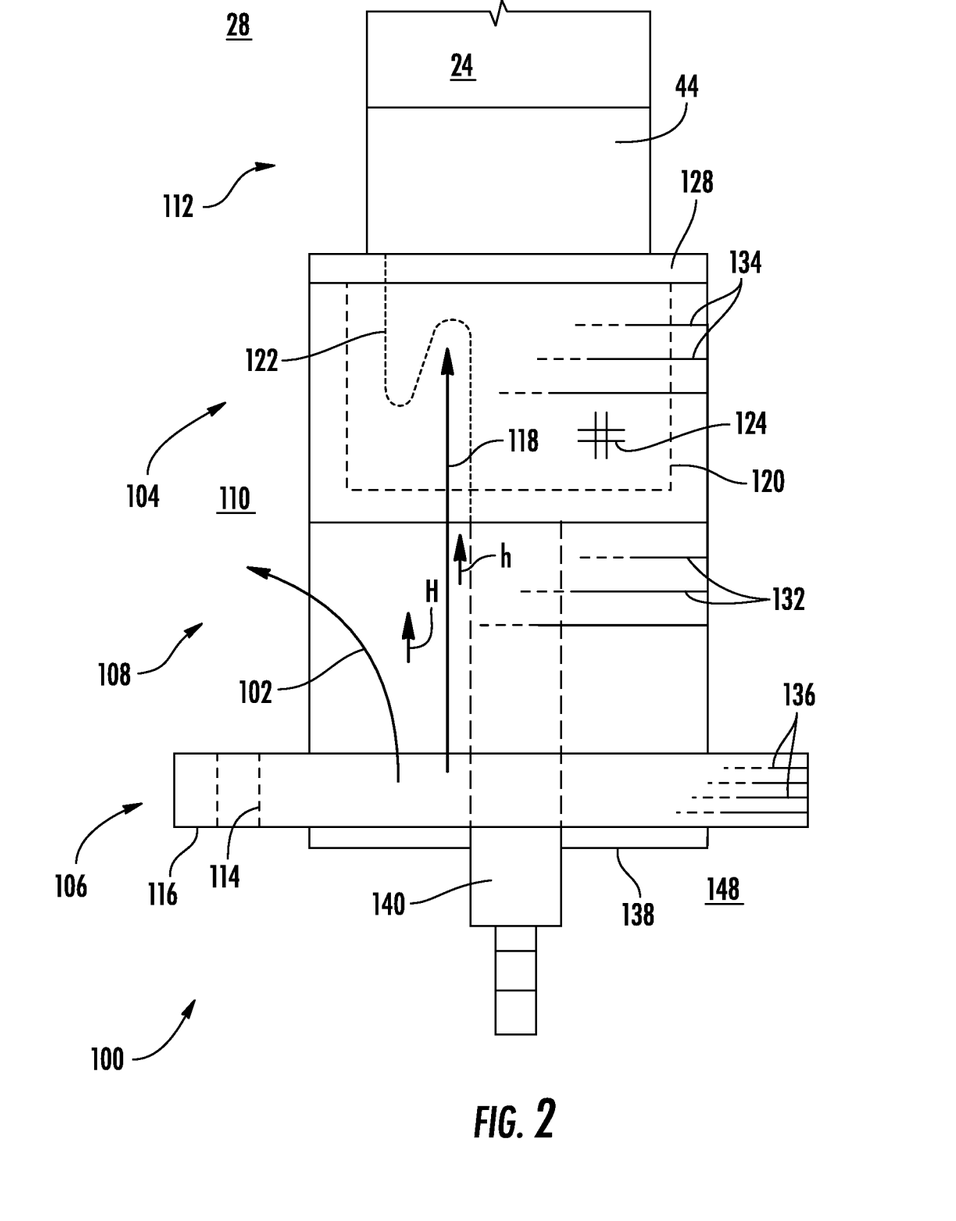
FIG. 2 is side elevation view of the sensor assembly of FIG. 1, schematically showing a thermal shunt portion coupling a mount portion to a housing portion of the sensor assembly.

With reference to FIG. 2, the sensor assembly 100 is shown. The sensor assembly 100 generally includes the housing portion 104, a mounting portion 106, and a thermal shunt portion 108. The thermal shunt portion 108 extends from the mounting portion 106. The housing portion 104 extends from the thermal shunt portion 108 and is arranged on a side 110 of the thermal shunt portion 108 opposite the mounting portion 106 to limit heat h conducted to a sensor connector 112 fixed to the housing portion 104 of the sensor assembly 100.

The mounting portion 106 of the sensor assembly 100 is configured and adapted for fixing the sensor assembly to the case 18 of the gas turbine engine 10 (shown in FIG. 1). As shown in FIG. 2 the mounting portion 106 defines a sensor fastener pattern 114. The sensor fastener pattern 114 corresponds to a case fastener pattern 34 (shown in FIG. 1) located on the case 18 of the gas turbine engine 10. The sensor fastener pattern 114 is defined through a flange 116 of the mounting portion 106. The flange 116 extends laterally outward from the thermal shunt portion 108 and the housing portion 104 of the sensor assembly 100.

The thermal shunt portion 108 of the sensor assembly 100 is configured and adapted to communicate heat H to the ambient environment 28 (shown in FIG. 1). In this respect the thermal shunt portion 108 and the mounting portion 106 define therethrough a low thermal resistance path 118 through the sensor assembly 100 that preferentially routes the heat H, received from the case 18 (shown in FIG. 1), to the ambient environment 28. In certain embodiments the thermal shunt portion 108 includes an airfoil structure 250 (shown in FIG. 3). In accordance with certain embodiments the thermal shunt portion 108 includes a lattice structure 350 (shown in FIG. 4). It is also contemplated that the thermal shunt portion 108 can include a heat sink, such as a fin or pin heat sink, as suitable for an intended application.

The housing portion 104 of the sensor assembly 100 is configured and adapted to support the sensor connector 112. In the respect the housing portion 104 defines a housing chamber 120. The housing chamber 120 is arranged to house at least partially a measurement lead 122. The housing chamber 120 is also arranged to house a potting material body 124. Further, the housing chamber 120 is arranged to receive thereon the sensor connector 112, e.g., via direct fixation with a brazed or welded joint 128.

It contemplated that one or more of the mounting portion 106, the thermal shunt portion 108, and the housing portion 104 be formed using an additive manufacturing technique. As shown in FIG. 2 each of the mounting portion 106, the thermal shunt portion 108, and the housing portion 104 are formed using an additive manufacturing technique. In this respect the mounting portion 106 includes a plurality of mounting portion layers 136 fused to one another and each formed from an interfused metallic particulate 130, the thermal shunt portion 108 includes a plurality of thermal shunt portion layers 132 fused to one another and each formed from the interfused metallic particulate 130, and the housing portion 104 includes a plurality of housing portion layers 134 fused to another and each formed from the interfused metallic particulate 130.

The thermal shunt portion layers 132 couple the housing portion layers 134 to the mounting portion layers 136. In certain embodiments the interfused metallic particulate 130 includes an aluminum or a steel material, aluminum being relatively lightweight while steel providing tolerance to relative high temperatures. As will be appreciated by those of skill in the art, forming at least the thermal shunt portion 108 using an additive manufacturing technique allows for construction of low thermal resistance path 118 with a shape corresponding to the convective requirements of the installation location contemplated for the sensor assembly 100.

With continuing reference to FIG. 2, the sensor assembly 100 additionally includes the sensor connector 112, the measurement lead 122, and the potting material body 124. The sensor assembly 100 also includes a thermal barrier layer 138, the brazed or welded joint 128, and a sensor 140.

The sensor 140 is fixed to the mounting portion 106 of the sensor assembly 100 and is configured to provide the signal 32 (shown in FIG. 1). In certain embodiments the sensor 140 includes a thermocouple. In accordance with certain embodiments the sensor 140 can include a pressure transducer. It is also contemplated, in accordance with certain embodiments, the sensor 140 can include a flow meter.

The sensor connector 112 is fixed to the housing portion 104 of the sensor assembly 100. More specifically, the brazed or welded joint 128 fixes the sensor connector 112 to the housing portion 104 of the sensor assembly 100. It is contemplated that the sensor connector 112 couple the measurement lead 122, and therethrough the sensor 140, to the harness connector 24 (shown in FIG. 1) of the engine harness 22 (shown in FIG. 1) to provide electrical communication therethrough of the signal 32. In certain embodiments the sensor connector 112 has a circular shell 144. In accordance with certain embodiments the sensor connector 112 can conform to a military standard, such as MIL-DTD-5025H, dated May 10, 2000. As will be appreciated by those of skill in the art in view of the present disclosure, employment of connectors having the circular shell 144 and/or conforming to a published standard simplify the fabrication of both the sensor assembly 100 and the 140 engine harness 22, e.g., with a corresponding standard electrical connector employed as the harness connector 24. Examples of suitable sensor connectors and harness connectors include those available from the Amphenol Corporation of Wallingford, Conn.

The potting material body 124 is disposed within the housing portion 104 of the sensor assembly 100. More specifically, the measurement lead 122 is supported within the housing chamber 120 by the potting material body 124, the potting material body 124 encapsulating the measurement lead 122. Advantageously, as the high thermal resistance path 102 includes the housing portion 104, the housing portion 104 remains relatively cool, and the heat h communicated to the measurement lead 122 by conduction through potting material body 124 is therefore less likely to cause embrittlement of the measurement lead 122 during service of the sensor assembly 100.

The thermal barrier layer 126 is disposed on a side 148 of the mounting portion 106 opposite the thermal shunt portion 108 of the sensor assembly 100. So disposed the thermal barrier layer 126 increase thermal resistance of both low thermal resistance path 118 and the high thermal resistance path 102. Notably, this lower the temperature of the housing portion 104, allowing the sensor connector 112 to employ a standard electrical connector that otherwise would be precluded from employment in the sensor assembly 100 in certain application. Examples of suitable thermal barrier materials include yttria-stabilized zirconia and Zirconium-based thermal barrier materials by way of illustration and not limitation.

Figure 3:
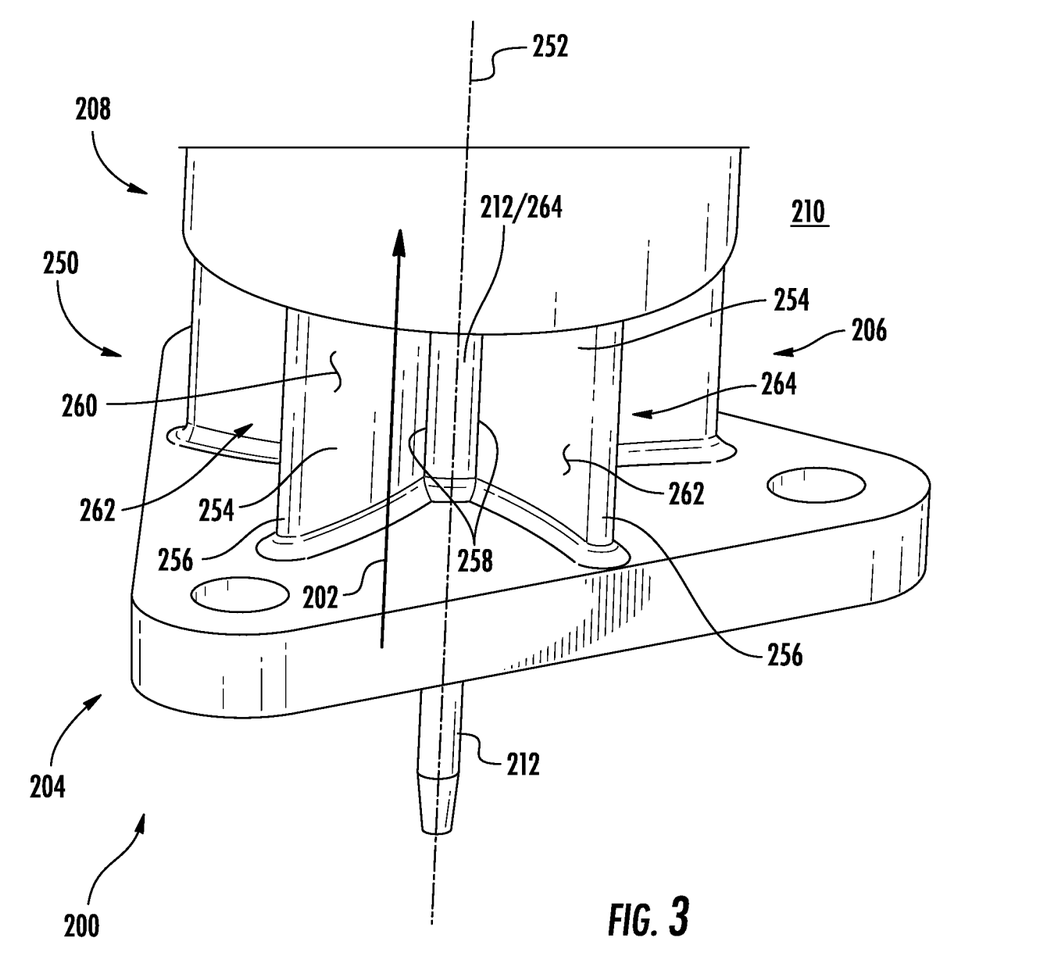
FIGS. 3-5 are perspective and cross-sectional views of the connector assembly of FIG. 1 according to an embodiment, showing a thermal shunt portion of the sensor assembly having an airfoil structure.
Figure 4:
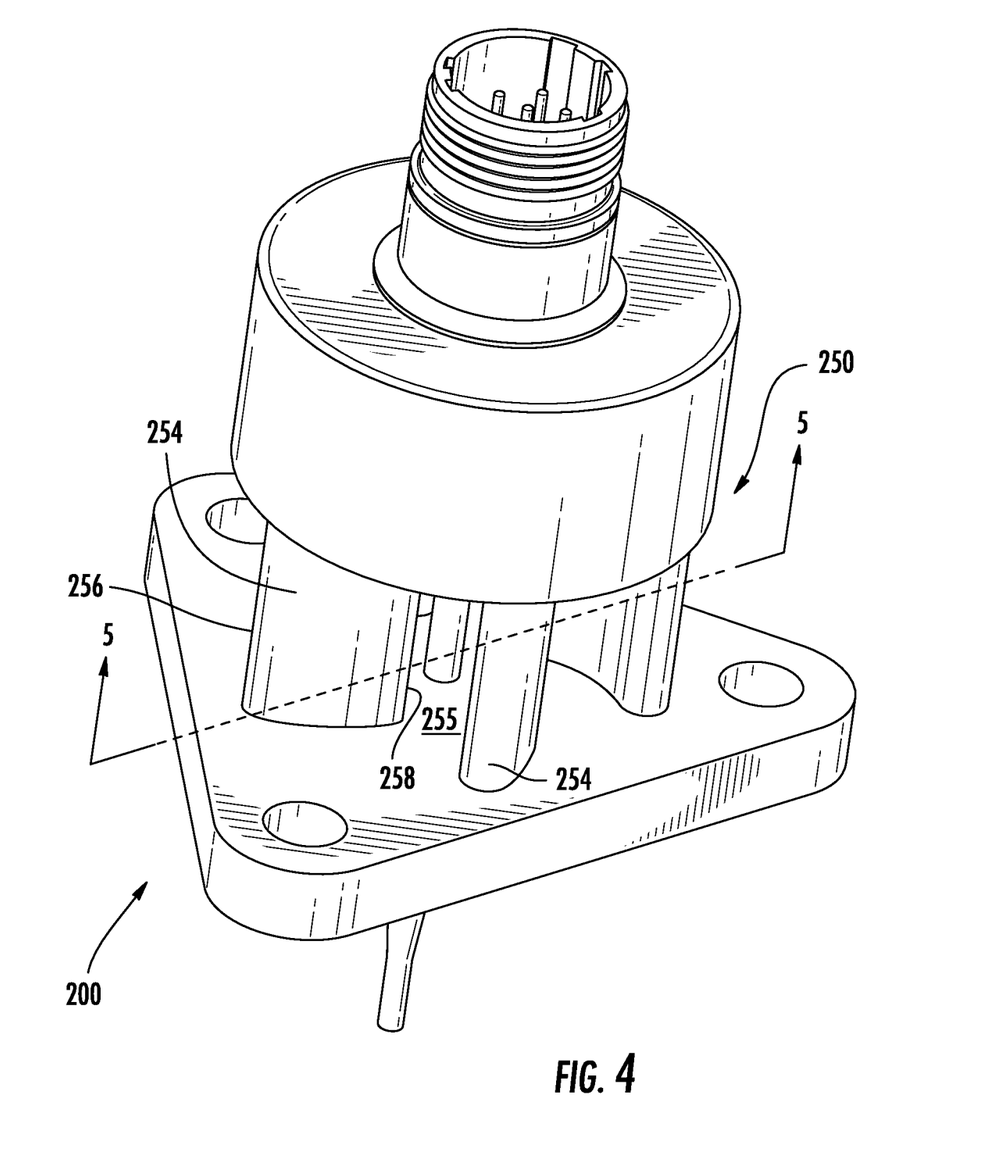
Figure 5:
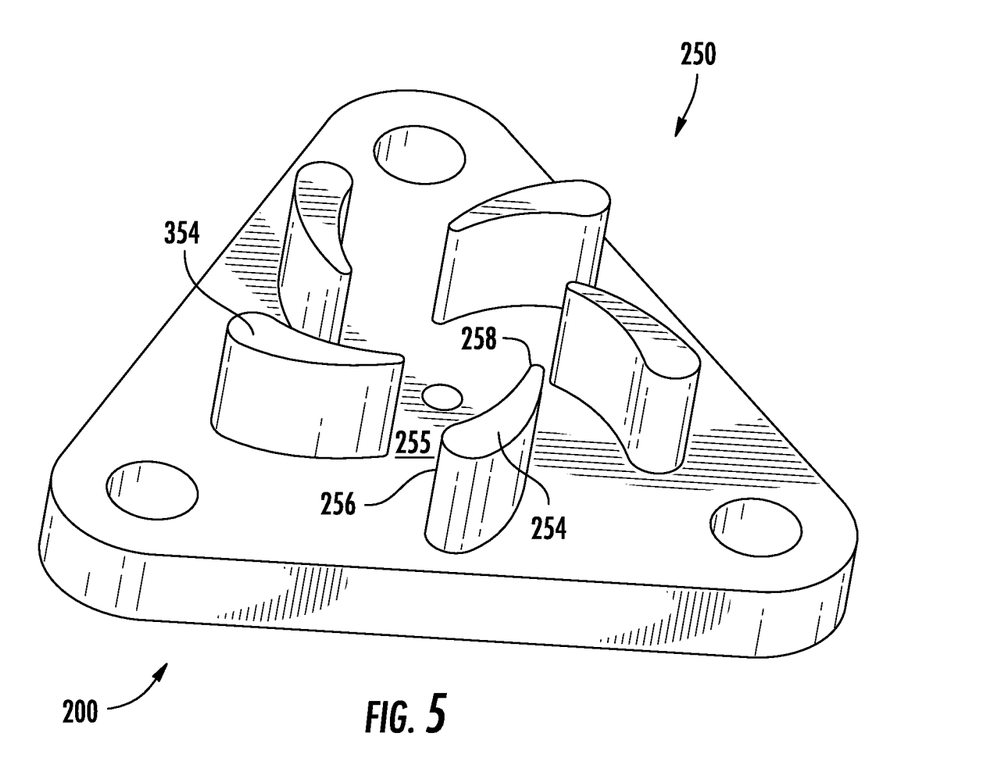

With reference to FIGS. 3-5, a sensor assembly 200 is shown. The sensor assembly 200 is similar to the sensor assembly 100 (shown in FIG. 1) and additionally includes an airfoil structure 250. As shown in FIG. 3, the sensor assembly 200 defines a high thermal resistance thermal path 202 and has a mounting portion 204, a thermal shunt portion 206 with an airfoil structure 250, and a housing portion 208. The thermal shunt portion 206 extends from the mounting portion 204. The housing portion 208 extends from the thermal shunt portion 206 and is arranged on a side 210 of the thermal shunt portion opposite the mounting portion 204 to limit h conducted to a sensor 212 fixed to the housing portion 208 of the sensor assembly 200.

The mounting portion 204, thermal shunt portion 206, and housing portion 208 are arranged along a sensor axis 252. The airfoil structure 250 extends between the mounting portion 204 and the housing portion 208 of the sensor assembly 200. More specifically, the airfoil structure 250 includes a plurality of airfoils 254 distributed circumferentially about the sensor axis 252. Each of the plurality of airfoils 254 has a leading edge 256, a trailing edge 258, a pressure face 260, and a suction face 262. The leading edge 256 bounds the pressure face 260 and the suction face 262 at a location radially outward of the trailing edge 258. As shown in FIG. 3, the trailing edge 258 bounds the pressure face 260 and the suction face 262 at a radially inner location, e.g., at the sensor 212 of a post structure 264, which provides strength to the sensor assembly 200. As shown in FIGS. 4 and 5, the post structure 264 can also be omitted, the trailing edge 258 of each airfoil 254 being spaced apart from that of the adjacent airfoil 254 by a gap 255, which allows coolant to fully traverse each of the airfoils 254.

The leading edge 256 and the trailing edge 258 extend between the mounting portion 204 and the housing portion 208, connect the mounting portion 204 to the housing portion 208, and join the leading edge 256 and the trailing edge 258 of each of the plurality of airfoils 254. It is contemplated that the plurality of airfoils 254 are equally spaced from one another about the sensor axis 252, which allows the sensor assembly 200 to transfer heat H from the mounting portion 208 irrespective of the direction of a convective air flow traversing the airfoil structure 250. As shown in FIG. 3 the airfoil structure 250 has six (6) airfoils 254. This is for illustration purposes only and is non-limiting as the airfoil structure 250 can have more than six (6) airfoils or fewer than six (6) airfoils, as suitable for an intended application.

Figure 6:
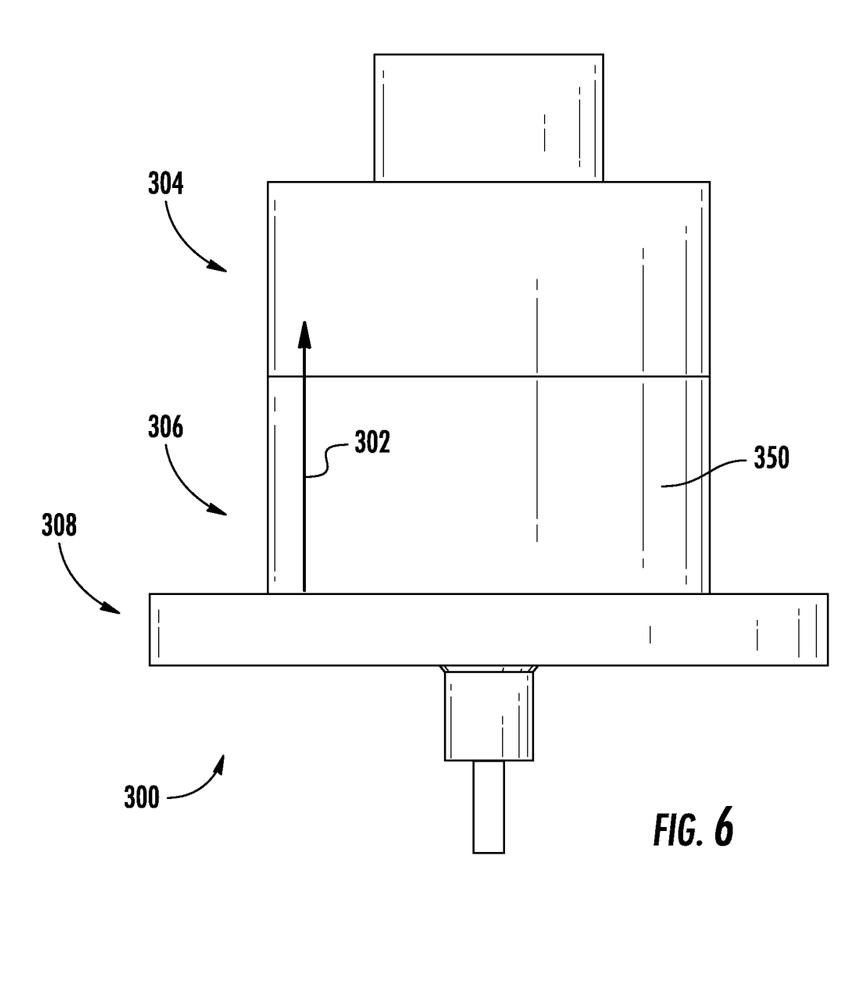
FIGS. 6-8 are schematic and side elevation views of the connector assembly of FIG. 1 according to another embodiment, showing a thermal shunt portion of the sensor assembly having a lattice structure.
Figure 7:
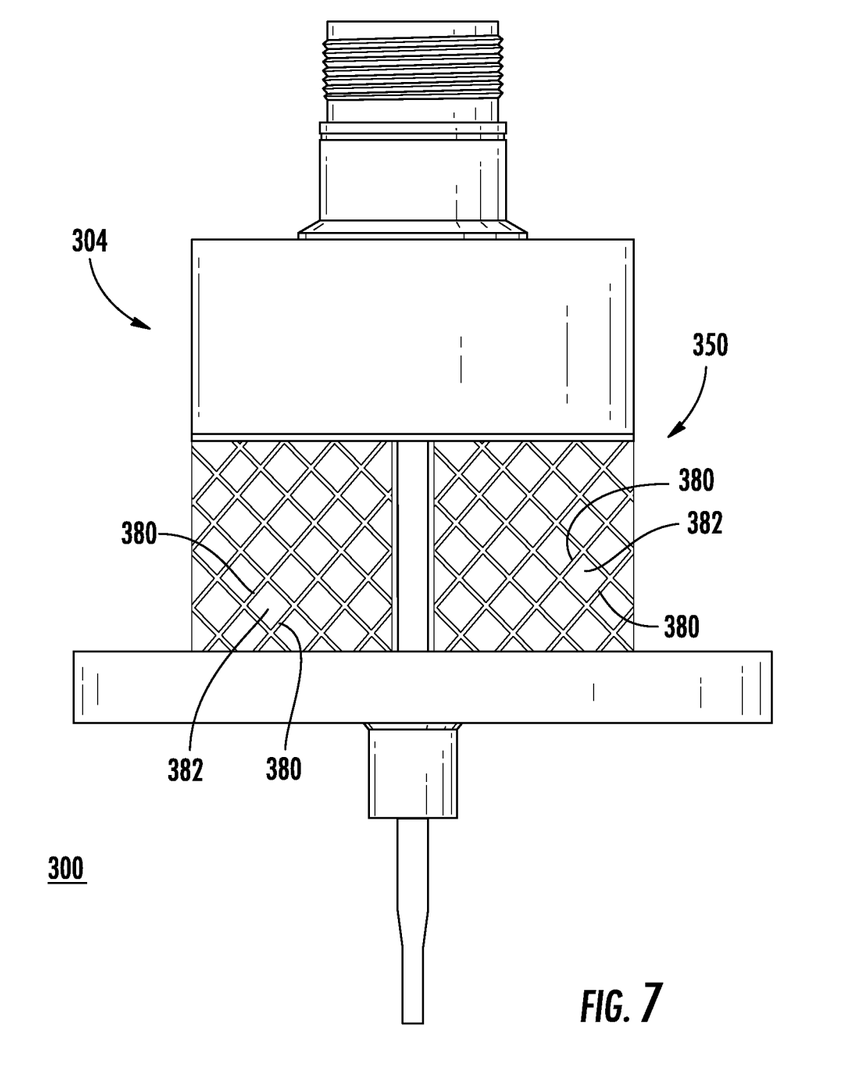
Figure 8:
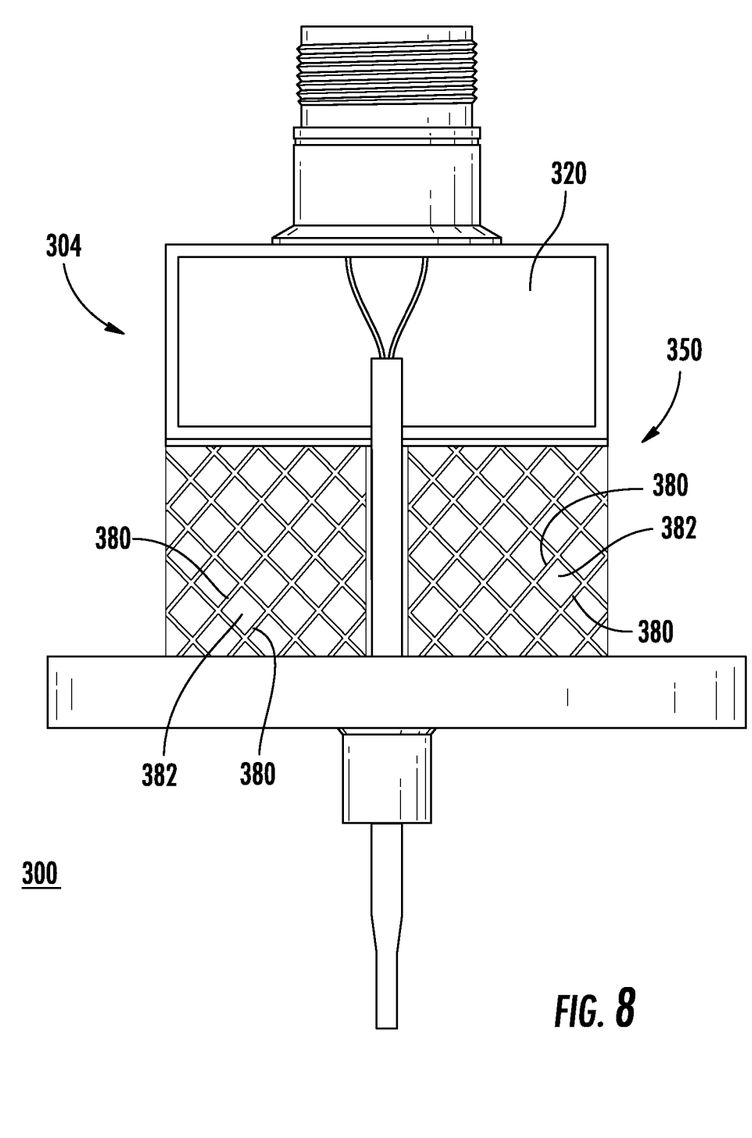

With reference to FIGS. 6-8, a sensor assembly 300 is shown. The sensor assembly 300 is similar to the sensor assembly 100 (shown in FIG. 1) and additionally includes a lattice structure 350. As shown in FIG. 6, the sensor assembly 300 defines a high thermal resistance thermal path 302 and has a mounting portion 306, a thermal shunt portion 304 with the lattice structure 350, and a housing portion 304. The thermal shunt portion 306 extends from the mounting portion 304. The housing portion 308 extends from the thermal shunt portion 306 and is arranged on a side 310 of the thermal shunt portion opposite the mounting portion 304 to limit heat conducted to a sensor 312 fixed to the housing portion 308 of the sensor assembly 300. As shown in FIGS. 7 and 8, in certain embodiments the lattice structure can include a plurality of interlaced stringers 380 with gasp 382 therebetween, the gaps 382 allowing coolant to traverse the sensor assembly 300 and the stringers providing structural support to a housing portion 304 and a potting material body 320 disposed within the housing portion 304.

Figure 9:
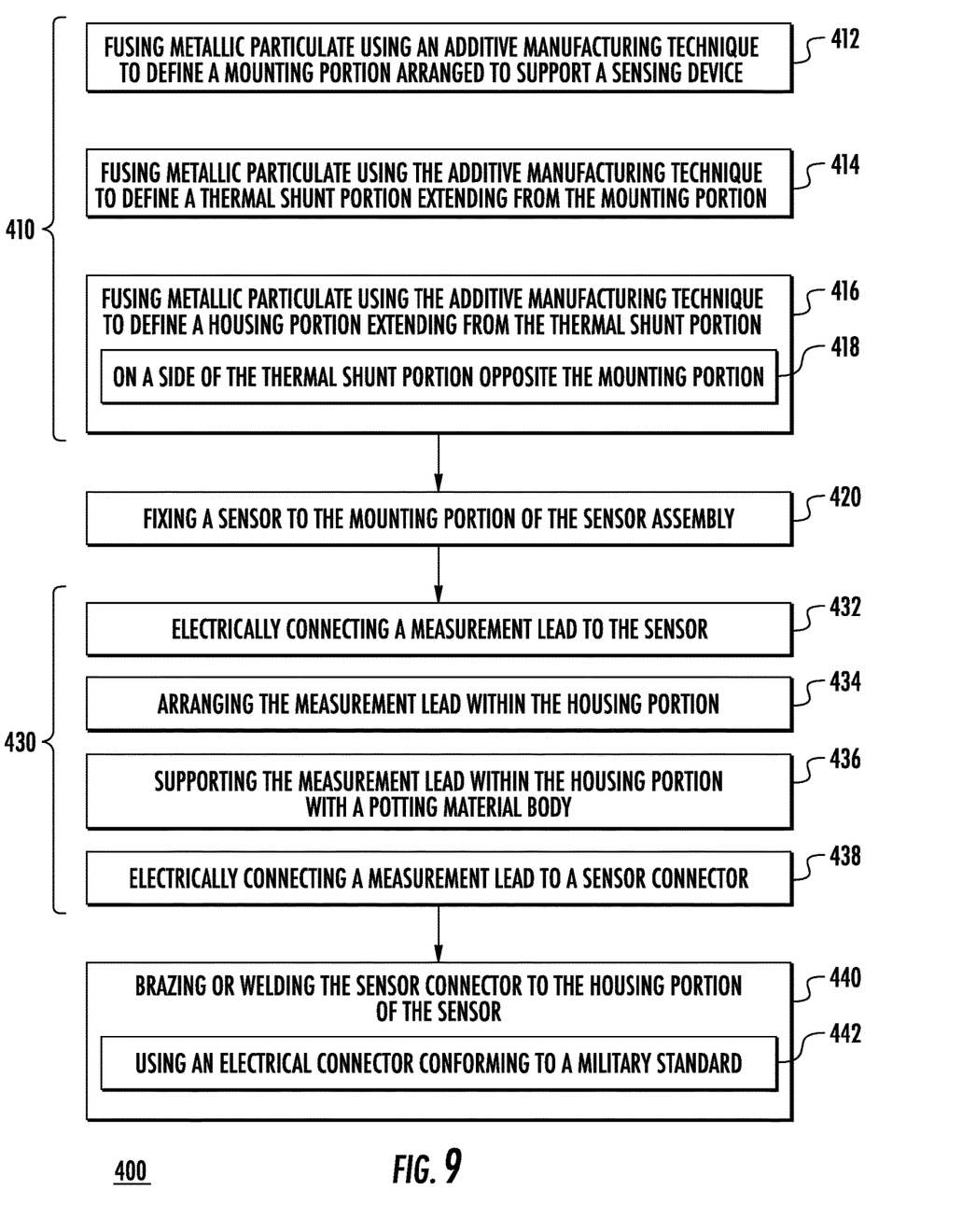
FIG. 9 is block diagram of a method of making a sensor assembly according to illustrative and non-limiting embodiment, showing steps of the method.

With reference to FIG. 9, a flow chart describing a method 400 of making a sensor assembly, e.g., the sensor assembly 100 (shown in FIG. 1), is shown. The method 400 generally includes fusing a metallic particulate, e.g., the interfused metallic particulate 130 (shown in FIG. 2), using an additive manufacturing technique to form a thermal shunt portion, e.g., the thermal shunt portion 108 (shown in FIG. 2), of the sensor assembly, as shown with box 414. Examples of suitable additive manufacturing techniques include powder bed fusion and laser sintering. The metallic powder can include aluminum and/or steel, as suitable for an intended application.

As generally indicated with bracket 410, it contemplated that the method 400 can include forming a mounting portion of the sensor assembly, e.g., the mounting portion 106 (shown in FIG. 2), and a housing portion of the sensor assembly, e.g., the housing portion 104 (shown in FIG. 2). For example, metallic particulate can be fused using the additive manufacturing technique to define a mounting portion arranged to support a sensing device, e.g., the sensor 140 (shown in FIG. 2), as shown with box 412. Alternatively (or additionally), metallic particulate can be fused using the additive manufacturing technique to define the housing portion such that the housing portion extends from the thermal shunt portion of the sensor assembly, as shown with box 416. It is contemplated that the housing portion be defined on a side of the thermal shunt portion opposite the mounting portion of the sensor assembly, as shown with box 418.

In certain embodiments the method 400 includes fixing a sensor, e.g., the sensor 140 (shown in FIG. 2), to the mounting portion of the sensor assembly, as shown with box 420. Fixation of the sensor to the mounting portion of the sensor can be done welding or brazing, as suitable for an intended application. Attaching the sensor to the mounting portion of the sensor assembly using welding or brazing has the advantage of simplifying fabrication of the sensor assembly, fixation of the sensor connector to the housing portion being done in concert with attachment of the sensor using a common brazing workflow for example.

In accordance with certain embodiments, the method 400 can include placing the sensor in electrical communication with the sensor connect, as generally indicated with bracket 430. In this respect a measurement lead, e.g., the measurement lead 122 (shown in FIG. 2), can be connected to the sensor, as shown with box 432. The measurement lead can be arranged within the housing portion of the sensor assembly, as shown with box 434. The measurement lead can be supported within the housing body by a potting material body, e.g., the potting material body 124 (shown in FIG. 2), as shown with box 436. It is also contemplated that the measurement lead can be electrically connected to the sensor connector, e.g., the sensor connector 112 (shown in FIG. 2), as shown with box 438.

It is also contemplated that, in accordance with certain embodiments, the method 400 can include brazing or welding the sensor connector to the housing portion of the of the sensor assembly, as shown with box 440. In certain embodiments the sensor connector be directly connected the housing portion of the sensor assembly, e.g., without an intermediate ceramic structure, limiting (or eliminating entirely) the risk of fracture that incorporation of a ceramic structure might pose to the sensor assembly. As will be appreciated by those of skill in the art in view of the present disclosure, this also reduces the risk of cracking within the braze itself due to the associated reduction in thermal coefficient mismatch between the materials forming the sensor connector and the housing portion of the sensor assembly relative to a ceramic material and the material forming the housing portion of the housing assembly.

As shown with box 442, method 400 can include brazing or welding an electrical connector, e.g., the sensor connector 112 (shown in FIG. 2), conforming to a military standard to the housing portion of the sensor assembly. This is possible because, during operation, the high thermal resistance path 102 (shown in FIG. 2) including the housing portion reduces the temperature of the housing portion and the electrical connector to below that of the mounting portion of the housing portion of the sensor assembly. In certain embodiments the housing portion of the sensor assembly runs more than 100° Celsius cooler than the mounting portion of the sensor assembly, allowing the electrical connector to remain at temperatures within its specified range notwithstanding the mounting portion of the sensor assembly experiencing temperatures above the electrical connector specified range.

Sensors, such as for gas turbine engines, commonly include electrical isolation between the sensing element-lead wires and housing. In high temperature applications electrical isolation is generally provided with a custom connector assembly having terminal studs and ceramic insulation for electrical isolation. In some sensors the ceramic insulation, e.g., the ceramic button, and/or the braze joint coupling the ceramic insulation to the sensor can fracture. Heat communicated to the sensor leads can also cause embrittlement of the sensor leads, potentially resulting in an open circuit within the sensor.

In embodiments described herein a thermal shunt portion of the sensor assembly is employed to limit heat interaction between the engine case and the housing portion of the senor assembly. This allows the sensor assembly to employ a standard electrical connector, e.g., an electrical connector with a circular shell and/or conforming to a standard like a military standard, limiting (or eliminating entirely) the risk that custom connectors would otherwise present to the sensor assembly. In certain embodiments the thermal shunt portion of the sensor assembly can be additively manufactured. In accordance with certain embodiments the thermal portion of the sensor assembly can include a airfoil structure or a lattice structure, the thermal shunt portion thereby defining a low thermal resistance path through the sensor assembly not including, i.e. bypassing, the housing portion of the sensor assembly. As a consequence the potting material supporting the measurement leads can run at relatively low temperature relative to the mounting portion of the sensor assembly. Further, a standardized circular sensor connector can be fixed to the housing portion of the sensor assembly, eliminating the need for customized terminal studs and/or ceramic insulation structures for electrical interfacing, potentially reducing the cost of the sensor assembly and/or reducing the likelihood of installation failures by avoiding the use of threaded terminals in the sensor assembly.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A sensor assembly, comprising:
   a sensor connector;
   a mounting portion spaced apart from the sensor connector;
   a thermal shunt portion extending from the mounting portion; and
   a housing portion having the sensor connector mounted thereon and extending from the thermal shunt portion, wherein the housing portion is arranged on a side of the thermal shunt portion opposite the mounting portion to limit heat conducted to the sensor connector;
   wherein the thermal shunt portion comprises an airfoil structure extending between the housing portion and the mounting portion of the sensor assembly;
   wherein the airfoil structure comprises an airfoil having a leading edge, wherein the leading edge extends from the mounting portion to the housing portion of the sensor assembly.

2. The sensor assembly as recited in claim 1, further comprising a thermocouple, a pressure transducer, or a flow meter fixed to the mounting portion of the sensor assembly; and further comprising a measurement lead arranged at least partially within the housing portion of the sensor assembly.

3. The sensor assembly as recited in claim 1, further comprising a sensor connector fixed to the housing portion of the sensor assembly, wherein the sensor connector has a circular shell or conforms to a military standard, and a brazed or welded joint fixing the sensor connector to the housing portion of the sensor assembly.

4. The sensor assembly as recited in claim 1, further comprising a potting material body disposed within the housing portion of the sensor assembly.

5. The sensor assembly as recited in claim 1, wherein the mounting portion has a sensor fastener pattern corresponding to a case fastener pattern located on a gas turbine engine case.

6. The sensor assembly as recited in claim 1, wherein the mounting portion and the housing portion of the sensor assembly are arranged along a sensor axis, wherein the airfoil structure comprises a plurality of airfoils distributed circumferentially about the sensor axis.

7. The sensor assembly as recited in claim 1, wherein the thermal shunt portion comprises a lattice structure extending between the housing portion and the mounting portion of the sensor assembly.

8. The sensor assembly as recited in claim 1, wherein the mounting portion comprises a plurality of mounting portion layers fused to one another, wherein the thermal shunt portion comprises a plurality of thermal shunt portion layers interfused to one another, and wherein the housing portion comprises a plurality of housing portion layers interfused with one another, each of the plurality of layers comprising an interfused metallic particulate, the plurality of thermal shunt portion layers coupling the plurality of housing portion layers to the plurality of mounting portion layers.

9. The sensor assembly as recited in claim 1, further comprising a thermal barrier layer disposed on a side of the mounting portion opposite the thermal shunt portion of the sensor assembly.

10. The sensor assembly as recited in claim 1, wherein the sensor assembly has a low thermal resistance path and a high thermal resistance path; wherein the low thermal resistance path includes the mounting portion and the thermal shunt portion, wherein the high thermal resistance path includes the mounting portion, the thermal shunt portion, and the housing portion.

11. A gas turbine engine, comprising: a case housing one or more of a compressor, a combustor, and a turbine; a sensor assembly as recited in claim 1; and an engine harness with a harness connector coupled to the sensor connector, wherein the harness connector and the sensor connector conform to a military standard.

* * * * *